May 24, 1927.
W. J. FRASER
1,629,497
SWITCH
Filed Jan. 24, 1924
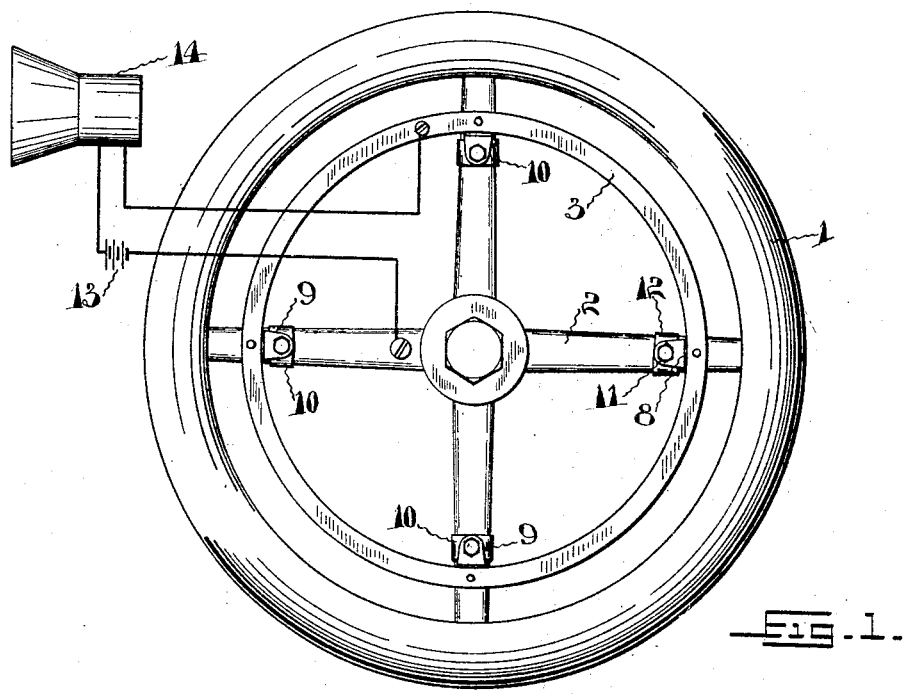
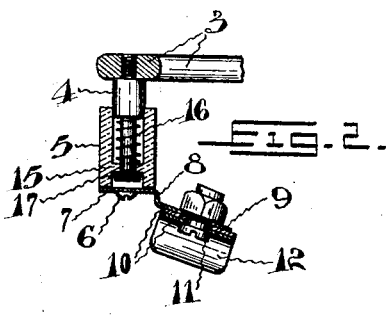
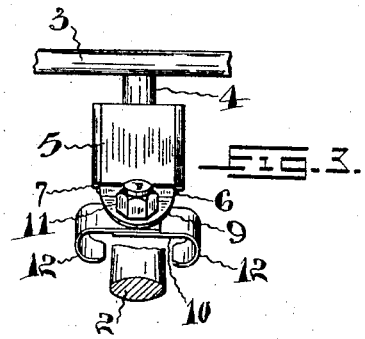
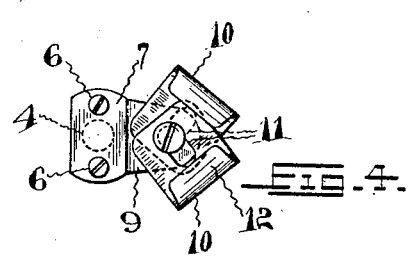
INVENTOR.
W. J. Fraser.
BY J. Edward Maybee
ATTY.

Patented May 24, 1927.

1,629,497

UNITED STATES PATENT OFFICE.

WILLIAM J. FRASER, OF TORONTO, ONTARIO, CANADA.

SWITCH.

Application filed January 24, 1924. Serial No. 688,321.

This invention relates to switches for attachment to the steering wheels of motor vehicles to control a signal circuit and my object is to devise a switch which may be actuated by the driver with either hand, without removing his hands from the wheel and with any position of the wheel, and which may be easily connected to any one of a number of steering wheels of different makes without special fitting.

I attain my objects by means of the constructions hereinafter described and illustrated in the accompanying drawings in which Fig. 1 is a plan view of an automobile steering wheel showing my device secured in position thereon;

Fig. 2 a cross section of one of the switches;

Fig. 3 a side elevation of the same; and

Fig. 4 a plan view of the underside of the fixed contact and its clamping jaws.

In the drawings like numerals of reference indicate corresponding parts in the different figures.

1 is a steering wheel including a rim which is suitably secured to a metal spider 2 which is formed with a hub secured to a steering spindle, revolvably mounted on a steering post or column (not shown).

The switch actuating ring 3 is provided with a plurality of depending plungers 4 which are slidably mounted in insulating members 5 detachably carried on the spider 2 in the following manner. The plungers 4 are threaded in or otherwise suitably secured to the ring and form the movable contacts of the switches, the bodies of which are formed by the insulating members 5. To the underside of each member 5 is secured by means of the screws 6, a plate 7 which is provided with a jog 8 having a laterally extending lug 9 formed thereon. The plates 7 are formed out of sheet metal stampings so that the lugs 9 will be integrally formed thereon, these lugs are adapted to be secured to the arms of the spider. The plates also serve as the fixed contacts of the switches and are adapted to be engaged by the movable contacts or plungers 4. A pair of jaws 10 are secured by means of bolt and slot connections 11 to each lug 9. These jaws are provided with hooked ends 12 adapted to fit round the sides of the radially disposed arms of the spider 2. The purpose of the bolt and slot connections is to permit these hooked ends to be expanded to pass over the spider arm; the jaws are then drawn towards one another to bring the hooked ends into engagement with the spider arm and then a nut on the bolt is tightened up to secure the jaws as adjusted.

With the above arrangement it is obvious that no machine work, such as drilling holes in the spider, has to be done before fitting the switch to the steering wheel. It is also evident that the clamp adjustments make the device readily attachable to different sized steering wheel spiders. The adjustable feature also enables the device to be firmly clamped on the arms of each spider even should the widths of the different arms vary relative to one another which is often the case.

A circuit connected with a source of electrical supply 13 and an electric horn 14 has one end connected to a suitable part of the spider 2, while the other end is connected with the ring 3. To yieldingly hold the plungers 4 out of contact with the plates or fixed contacts 7 I provide the following means. Each insulating member is counterbored at opposite ends of the hole, for the passage of the plunger 4, to form an abutment 15 intermediate the ends of the member. The upper end of each plunger is also enlarged to slidably engage the upper counterbore and to form a shoulder on the plunger for engagement with one end of a coil spring 16 disposed on the reduced portion thereof. The other end of the coil spring 16 engages the abutment 15. The lower ends of the plungers are threaded to receive nuts 17 adapted to engage the undersides of the abutments 15 to limit the outward movement of the ring 3.

From the above description it is evident that by simply pressing against any point on the ring that at least one of the plungers or movable contacts 4 will be depressed to engage its fixed contact or plate 7 whereby the circuit will be completed to cause the horn, or any other device connected in the circuit, to function.

What I claim is:—

1. The combination with a steering wheel spider having radial arms, of a metal ring having a plurality of metal plungers secured thereto; insulating members adapted to slidably receive the plungers; and plates forming fixed contacts secured to said members and adapted to be engaged by the plungers, the said plates being formed of sheet metal and having integral lugs formed thereon extending parallel to the arms of the spider; and an adjustable clamping device connected to each lug and adapted to embrace one of the arms of the spider.

2. The combination with a steering wheel spider having arms, of a ring having a plurality of plungers secured thereto; insulating members adapted to slidably receive the plungers; plates adapted to be engaged by the said plungers, each plate having two holes formed therein, one at each side of the plunger; screws passing through said holes and threaded in said insulating members; the plates being provided with integral lugs; and a plurality of pairs of jaws having pin and slot connections with the lugs, each pair of jaws having oppositely directed hooked ends for engagement with the arms of the spider.

Signed at Toronto, Canada, this third day of January, 1924.

WILLIAM J. FRASER.